United States Patent
Soar et al.

[11] Patent Number: 5,942,884
[45] Date of Patent: Aug. 24, 1999

[54] ELECTRONIC TRANSFORMER/REGULATOR

[76] Inventors: Stephen Soar, Temple Works, Temple Street, Oldham, Lancashire OL1 3NJ; Simon Richard Greenwood, Brookdale Cottage, Chalford Road, Henbury, Macclesfield SK10 3LH, both of United Kingdom

[21] Appl. No.: 08/979,981

[22] Filed: Nov. 26, 1997

[51] Int. Cl.⁶ .............................. G05F 1/44; G05F 1/652; H02M 7/00
[52] U.S. Cl. ........................... 323/282; 323/222; 363/101
[58] Field of Search ..................... 323/222, 224, 323/282, 283, 284, 285; 363/16, 101, 124, 34, 37, 47, 132

[56] References Cited

U.S. PATENT DOCUMENTS

| | | |
|---|---|---|
| 4,347,474 | 8/1982 | Brooks et al. . |
| 4,736,151 | 4/1988 | Dishner ................................. 323/224 |
| 4,801,859 | 1/1989 | Dishner ................................. 323/224 |
| 5,598,326 | 1/1997 | Liu et al. ................................ 363/34 |

FOREIGN PATENT DOCUMENTS

| | | |
|---|---|---|
| A-2050081 | 3/1980 | United Kingdom . |
| A-2045549 | 10/1980 | United Kingdom . |
| A-2137030 | 3/1984 | United Kingdom . |
| A-2170663 | 2/1985 | United Kingdom . |
| A-2177556 | 6/1986 | United Kingdom . |
| A-2200803 | 12/1987 | United Kingdom . |
| A-2207565 | 12/1987 | United Kingdom . |
| A-2204455 | 11/1988 | United Kingdom . |
| A-2258351 | 7/1992 | United Kingdom . |
| A-2265771 | 3/1993 | United Kingdom . |
| A-2279514 | 6/1993 | United Kingdom . |
| A-2271226 | 9/1993 | United Kingdom . |
| A-2301239 | 6/1995 | United Kingdom . |

*Primary Examiner*—Adolf Deneke Berhane
*Attorney, Agent, or Firm*—Schmeiser, Olsen & Watts

[57] ABSTRACT

In a voltage regulator converter circuit comprising an input 20 and an output 25, an input signal can be controlled by applying a high frequency switching signal (1 KHz–30 MHz) to an input circuit 12, 13, 16 and 17. An output of the circuit is obtained via an inductor 28 and a capacitor 29. The input can be DC to 500 Hz and the output can be DC or AC. Switches 12, 13, 16 and 17 can be thyristors, bipolar transistors, field effect transistors or IGBi transistors. Diodes 11, 14, 15 and 18 are connected in series with the switches 12, 13, 16 and 17. In an alternative embodiment (FIG. 9) the four switches can be connected in series between an AC input and an output is obtained from a center point of the series connection via an inductor (106) and a capacitor (107). A further aspect (FIG. 10) relates to transformed coupled input and output switching stages.

21 Claims, 5 Drawing Sheets

ELECTRONIC TRANSFORMER/ REGULATOR

DESCRIPTION

The present invention relates to the field of electrical power supplies, and particularly although not exclusively to an AC voltage regulator.

A conventional AC variable transformed (a variac) for stepping down a mains voltage, for example 240 volts AC to a reduced AC voltage, comprises an AC input terminal, across which is connected an inductive winding, and an AC output terminal, which takes power from the winding at a selectable voltage, depending upon where a wiper blade is positioned along the winding. The wiper is typically a rotating wiper which rotates across the winding which is formed in a substantially cylindrical or ring shape. The wiper may be driven by a servo motor, in order to automatically move the wiper, thus varying the output voltage, in response to a control signal.

However, the conventional variac has the problem of high weight, large size, poor response time in moving the wiper blade, and produces noise which is fed back onto the mains supply, and at the output terminal.

Figure 1:
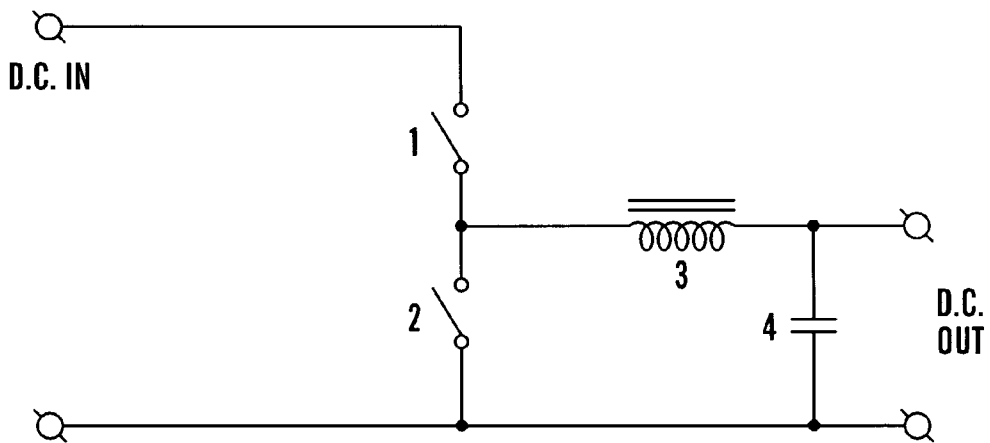
FIG. 1 shows a conventional related art circuit having two switches.

In the field of conventional DC step down regulators an example of which is as shown in FIG. 1 of the accompanying drawings, a conventional DC regulator is provided with a DC input, a DC output, and a pair of switches comprising first and second switches 1,2 respectively, which operate at high frequency. The output voltage at the output terminal is proportional to the mark space ratio of the switching signal which is used to control the switches. For example if the pair of switches 1,2 operates to connect the DC output to the DC input with a 50% mark/space ratio, the output voltage $V_{out}$ provided at the output terminal, after smoothing by the smoothing circuit comprising a capacitor 4 and an inductor choke 3, will be 50% of the input voltage $V_{in}$ ie. related by the expression:

$V_{out}$=50% $V_{in}$

Similarly, for a 20% mark/space ratio for the switches 1,2 connecting the DC input to the DC output, the output voltage will be 20% of the input voltage, ie:

$V_{out}$=20% $V_{in}$

In the conventional DC regulators it is essential that the pair of switches 1 and 2 do not close simultaneously, as this will cause short circuit of the DC input supply. Thus the switches 1,2 are controlled so that the switch 1 opens just before the switch 2 closes, and conversely the switch 2 opens just before the switch 1 closes. In the period in each switching cycle, in which both the switches 1 and 2 are open is called the "dead time".

During the dead time, the choke inductor 3 is open circuit, and consequently, the stored energy in the choke produces high voltages which occur across the switches 1,2. This often leads to catastrophic failure of the circuit elements, particularly the switches.

Figure 2:
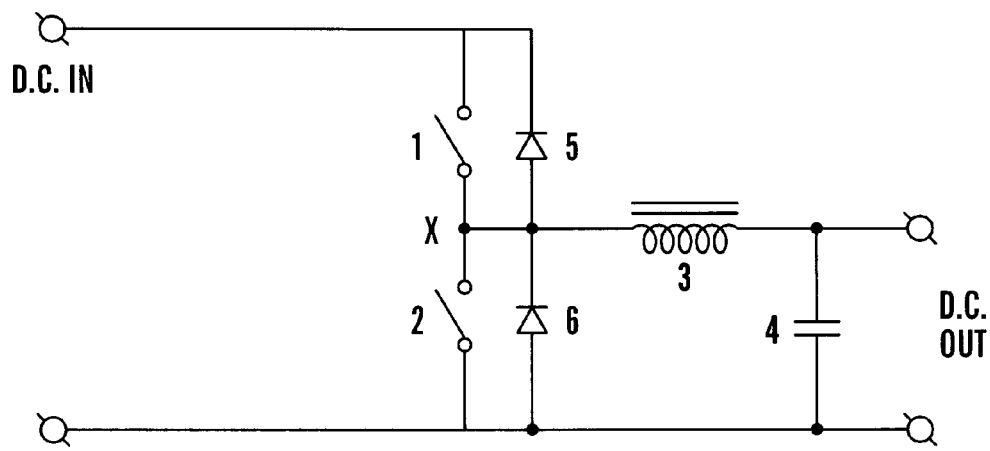
FIG. 2 shows the conventional related art circuit of FIG. 1 including a diode connected in parallel to each of the switches.

The conventional circuit of FIG. 1 may be modified by the inclusion of a respective diode connected in parallel with each of the switches 1,2 to provide the arrangement as shown in FIG. 2 of the accompanying drawings.

In the circuit of FIG. 2, during the dead time a current path is maintained through one or other of the diodes, depending on the direction of current, and current may be returned to the DC rails.

Due to the inclusion of the first and second diodes, the voltage at a node X, between the switches 1,2 is unable to fluctuate outside the incoming DC input voltage plus the diode's forward voltage drop, so that the voltage occurring across either switch cannot exceed the DC supply voltage by more than the forward voltage drop of a conducting diode.

Figure 3:
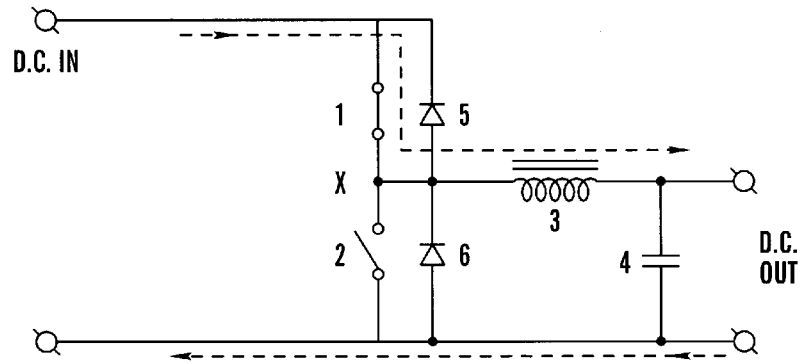
FIG. 3 shows the conventional related art circuit of FIG. 2 with the first switch closed.
Figure 4:
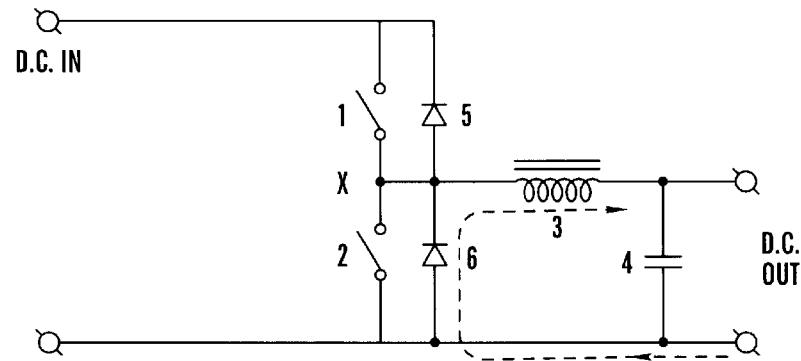
FIG. 4 shows the conventional related art circuit of FIG. 2 with both the first and second switches open.
Figure 5:
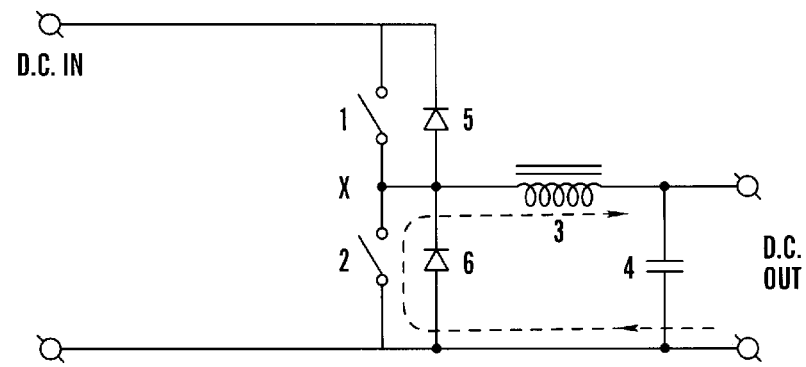
FIG. 5 shows the conventional related art circuit of FIG. 2 with the second switch closed.

In FIGS. 3 to 5, there are shown various modes of operation of the circuit of FIG. 2, being in FIG. 3, with the first switch 1 closed, in FIG. 4 with both of the first and second switches 1,2 open (corresponding to the dead time in the switching cycle) and in FIG. 5 showing the second switch 2 closed. The dotted lines show the current flow in each of these conditions. Referring to FIG. 4, when both of the first and second switches are open, there exists a current path between the DC output terminals, via the second diode 7. Similarly, referring to FIG. 5, when the second switch is closed, a current path flows between the DC output terminals via the closed second switch.

Referring to FIG. 3, when the first switch is closed and the second switch is open, current may flow directly between the DC input rails and DC output rails, and the voltage across the DC output is limited to be no more than the voltage occurring across the DC input supply.

Specific embodiments to the present invention aim to provide an AC voltage regulator which has reduced size and weight compared to conventional wire wound variable transformers of the type including a wiper blade driven across a winding by manual means or by a servo motor.

Embodiments of the present invention seek to provide an easily controlled AC voltage regulator capable of transforming alternating current of a first voltage into alternating current of a second voltage.

According to a first aspect of the present invention there is provided a voltage regulator circuit comprising:

an AC input having first and second input terminals for receiving an AC input signal;

an AC output having first and second output terminals for outputting an AC output signal; and switching means for alternatively connecting and disconnecting the input terminals with the output terminals so as to allow or prevent transmission of the input signal to the output, the switching means being arranged to switch in response to a control signal, wherein the switching means comprises a first switching means and a second switching means, controlled by the control signal so that during one half cycle of the AC input the first switching means is closed and the second switching means is alternatively opened and closed, and during the inverse half cycle of the AC input the second switching means is closed and the first switching means is alternatively opened and closed.

The circuit may have an advantage of being less bulky than a prior art variac type AC voltage transformer or prior art fixed output auto transformer.

Preferably, a said control signal is of a frequency higher than a frequency of said AC input signal.

Preferably, the circuit further comprises a control means for generating the control signal for controlling the switching means.

By varying a parameter of the control signal, such as a duty cycle or phase relationship of the control signal, the proportion between the time in which the input is connected to the output, and consequently the proportion between the time in which the AC input signal is transmitted to the output, to appear as the output signal, can be varied. Further, as the rms voltage of the output signal is dependant on the proportion of the AC input signal transmitted to the output, the voltage of the output signal may be controlled by varying the control signal parameter(s).

The circuit may have an advantage of allowing step down in voltage from an AC mains supply of a first, higher voltage, to an AC output of a second, lower voltage, in an easily controllable manner. The circuit may also be used to step up an AC supply of a lower voltage to an AC output voltage of a higher voltage. The circuit may be capable of responding to changes in required output voltage more rapidly than conventional variacs or conventional auto transformers, and of producing an adjustable, stable AC output from an AC input source, without producing significant frequency harmonics fed back onto the input.

Preferably, the switching means comprises a first switching means and a second switching means. Preferably said first switching means is connected between said first input terminal and said first output terminal.

Preferably, said second switching means is connected between said second input terminal and said first output terminal.

Preferably, the first switching means operates to alternately connect and disconnect the first input terminal with the first output terminal. Preferably the second switching means acts to alternately connect and disconnect the first output terminal with at least one of the second input terminal and/or the second output terminal.

Preferably, the first and second switching means are alternately switched during single cycle of a control signal. Preferably the frequency of the switching cycle is in the range 1 kHz–100 kHz. An input frequency of the AC input supply may lie in the range DC to 500 Hz.

Preferably, the first and second switching means operate alternately in the switching cycle such that when the first switching means is non-connective, ie. in an OFF condition, the second switching means alternates at high frequency ON and OFF, and vice versa.

The first and second switching means are preferably simultaneously each non connecting for a pre determined time in each said switching cycle.

Preferably, in one said switching cycle in which the first and second switching means are alternately turned ON and OFF, the ratio of the duration in which the first switching means is turned ON, to the duration in which the second switching means is turned ON, being variable.

Said control means may comprise a pulse width modulation circuit responding to an input from means such as a potentiometer, computer or a feedback circuit or a combination of these. The control means may provide a control signal comprising a pulse width modulated signal having a frequency in the range of the operating frequency of the switching means, for example 1 kHz–100 kHz.

Preferably, said first switching means comprises first and second electronic switches. Said first and second electronic switches preferably each comprise a transistor or other semiconductor switching device, operable in response to a said control signal.

Preferably, said second switching means comprises third and fourth switches. Said third and fourth switches are preferably operable in response to said control signal.

Preferably, said first and second switching means are connected between said first and second input rails, the first and second switching means being connected at a common connection node, which is also connected to said first AC output terminal.

Preferably said circuit comprise means for dissipating current from said common node, when said first and second switching means are both non conductive, or "OFF".

Preferably said current dissipating means comprise one or a plurality of diodes, preferably, current is arranged to dissipate via a single transistor and a single diode at any given time.

A said switch and a said diode may be included in a single integrated circuit.

Preferably, there is provided a filter between the output terminal and the input terminal. Said filter is preferably provided between the switching means and the output. The filter preferably comprises an inductor and a capacitor. The conductor may be connected serially between the switching means and the first or second output terminal. The capacitor may be connected in parallel with the first and second output terminal.

According to a second aspect of the present invention, there is provided a transformer circuit for transforming an input signal having an input voltage to an output signal having an output voltage, the transformer circuit comprising:

an input having first and second input terminals for receiving the input signal;

an output having first and second output terminals for outputting the output signal;

switching means for alternately connecting and disconnecting the input terminals with the output terminals so as to allow or prevent transmission of the input signal to the output, the switching means being arranged to switch in response to a control signal; and an isolating transformer for isolating the input from the output.

Said input signal may comprise a signal of variable voltage. Said input signal may comprise an AC or a DC signal.

Said output signal may comprise a signal of varying voltage with time. The output signal may comprise an AC or a DC signal.

Preferably said switching means comprises an input switch between the input and a primary of said transformer; and an output switch between the output and a secondary of said transformer.

Preferably said input switch is controllable in response to an input control signal. Preferably said output switch is controllable in response to an output control signal.

Preferably said input switch is arranged to connect and disconnect said input signal with said transformer primary in response to said input switch control signal. Preferably said output switch is arranged to connect said secondary transformer winding with said output in response to said output switch control signal.

By controlling a parameter of said input switch control signal, a time proportion between a period of connection of said input signal with said transformer primary and a period of disconnection of said input signal with said primary may be varied. By controlling a parameter of said output switching signal, a proportion between a period of connection of said transformer secondary with said output and a period of disconnection between said secondary and said output may be controllably varied.

By varying of said parameter of said input switch control signal and/or said output switch control signal, an rms voltage of said output signal may be controllably varied.

Suitably, the filter comprises a capacitor connected between the first and second output terminals, and an inductor, preferably a choke, connected in series with the first output terminal between the first output terminal and the switching means.

The invention includes a method of transforming or regulating an input signal having an input voltage to produce an output signal having an output voltage, the method comprising the steps of alternately allowing or preventing transmission of the input signal by means of a switch, the switch being controllable to vary the ratio of the time periods in which the input signal is transmitted or prevented, within a switching cycle.

Figure 6:
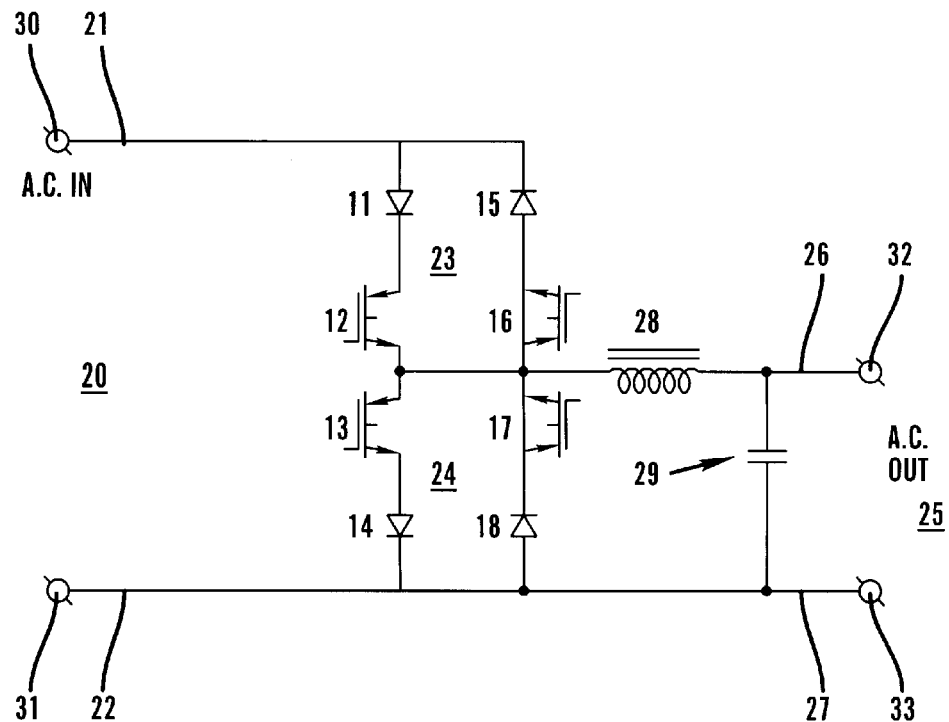
FIG. 6 shows a first AC voltage regulator according to a first specific embodiment of the present invention.
Figure 7:
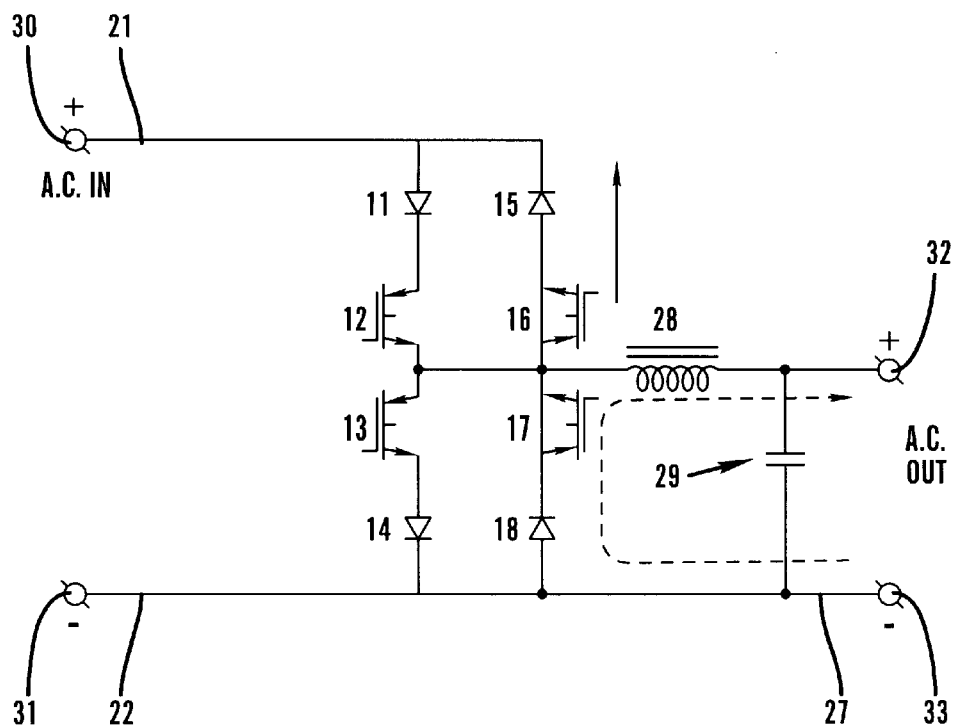
FIG. 7 shows the first AC voltage regulator during a positive half cycle of the AC input signal.
Figure 8:
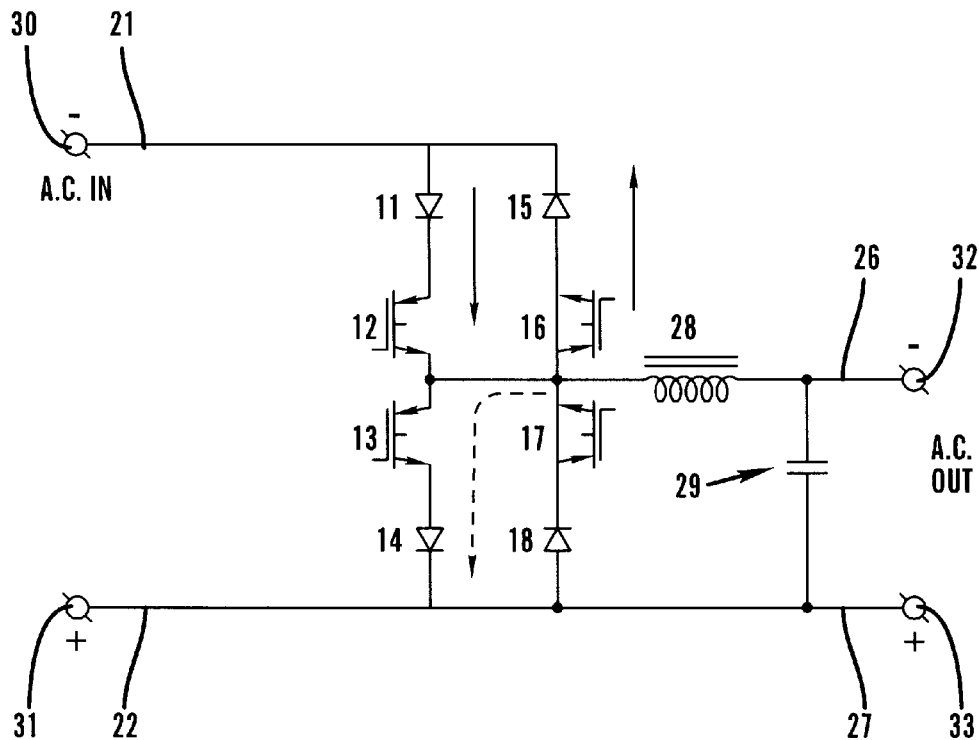
FIG. 8 shows the first AC voltage regulator during a negative half cycle of the AC input signal.
Figure 9:
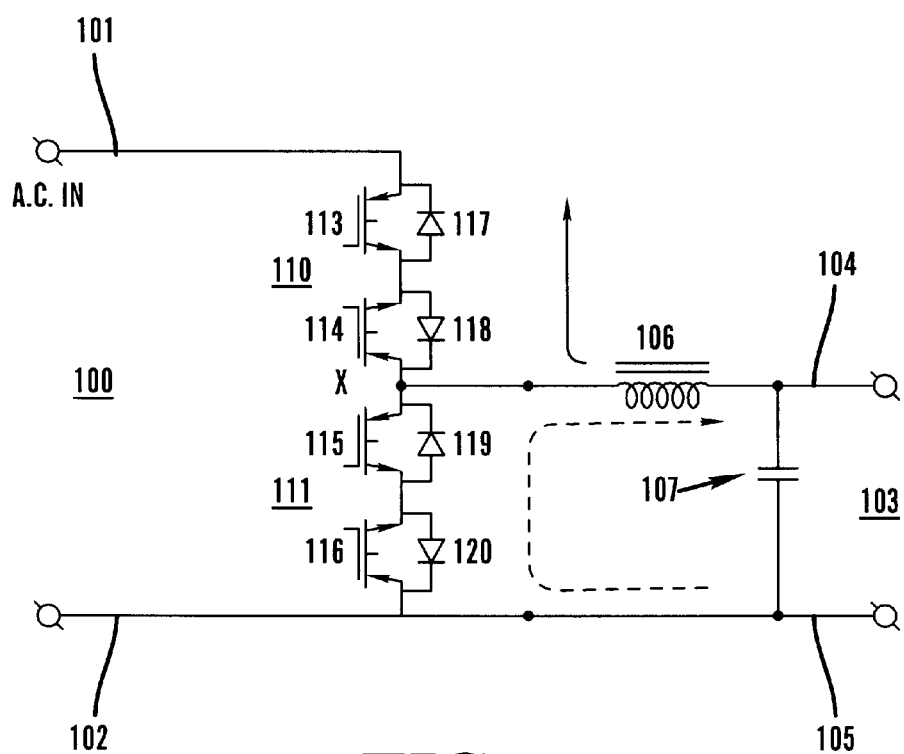
FIG. 9 shows a second AV voltage regulator according to a second specific embodiment of the present invention.
Figure 10:
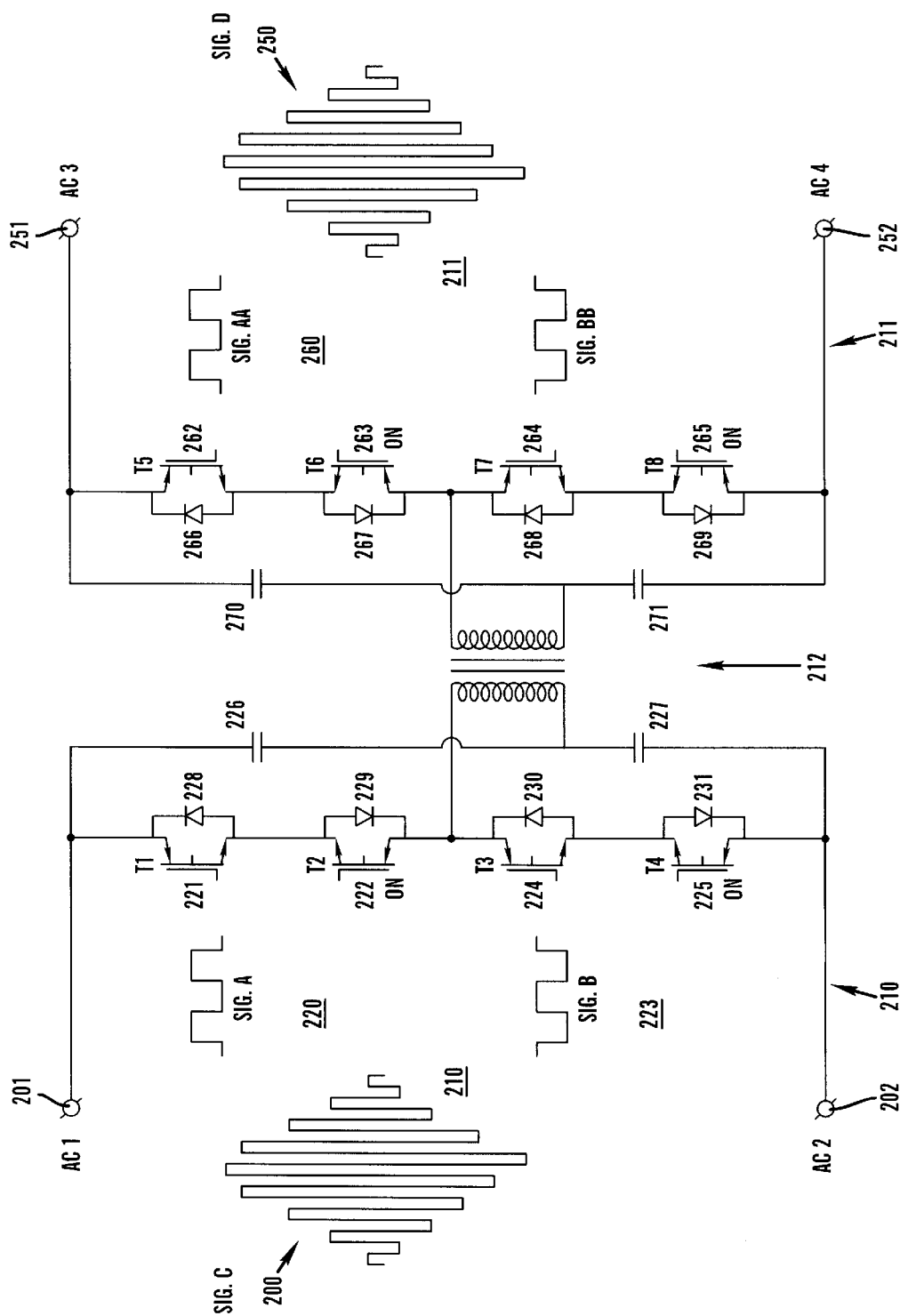
FIG. 10 shows a third specific embodiment according to the present invention.

For a better understanding of the invention, and to show how embodiments of the same may be carried into effect, reference will now be made, by way of example, to the accompanying diagrammatic drawings, in which:

FIG. 6 shows a first AC voltage regulator according to a first specific embodiment of the present invention;

FIG. 7 shows the first AC voltage regulator during a positive half cycle of the AC input signal;

FIG. 8 shows the first AC voltage regulator during a negative half cycle of the AC input signal;

FIG. 9 shows a second AC voltage regulator according to a second specific embodiment of the present invention; and FIG. 10 shows a third specific embodiment according to the present invention.

Referring to FIG. 6 of the accompanying drawings, a first AC voltage regulator circuit comprises an alternating current input 20 comprising first and second input terminals 30,31 connected respectively to a first voltage input rail 21 and a second voltage input rail 22; connected between the first and second input voltage rails, first and second switching means 23,24 respectively, connected in series across the input voltage rails, the first switching means comprising a first electronic switch 12 connected in antiparallel with a third electronic switch 16, and the second switching means comprising a second electronic switch 13 connected in antiparallel with a fourth electronic switch 17; connected in series on either side of the first and second switching means, first and second diodes 11,14 respectively, the first and second diodes arranged for conduction of current in a first direction between the first and second input rails; connected between the switching means and the input rails, on either side of the second switching means respectively, a third diode 15 and a fourth diode 18, the third and fourth diodes arranged for conduction of a current between the first and second input rails in an opposite direction to the current direction permitted by the first and second diodes 11,14; an AC output 25 comprising first and second output terminals 32,33 respectively, the first output terminal 32 being connected to a first output rail 26, and the second output terminal 33 being connected to a second output rail 27; a connection between the first and second switching means being commoned at a node X, the commoned connection being connected via a series inductor 28 to the first output rail 26; and connected between the output rails 26,27 of the AC output terminal 25, a capacitor 29, the capacitor 29 and the inductor 28 forming a smoothing filter.

By "anti parallel" referred to above in relation to the connections between the first and third electronic switches 12 and 16 respectively, this may include the situation where two diodes are connected in series. Similarly, for the connection between the second electronic switch 13 and the fourth electronic switch 17.

The circuit of FIG. 6 operates as follows:

Referring to FIG. 7 of the accompanying drawings, an alternating current input is applied to the AC input terminals 30,31. During a positive half cycle of the input waveform signal, the second input rail 22 is held negative with respect to the first input rail 21. The third and fourth switches 16,17 respectively are held "ON". The third and fourth diodes 15,18 respectively are reverse biased, and therefore non conductive, and prevent short circuit of the input supply rails/terminals via the third and fourth switches.

The first and second switches 12,13 are operated via a control means to alternately connect the common node "X" to which the first output rail is connected via the inductor 26, either to the first input rail 21 or to the second input rail 22. During one switching cycle of the control means the average voltage at the common node "X" is substantially proportional to the ratios of "on" time between the first and second switches 12,13 or to the "Mark to Space Ratio" expressed as a percentage, times the instantaneous voltage across the input terminals 21,22. The operating frequency of the first and second switches is typically in the order of several tens of kHz, whereas the frequency of the AC input supply may be typically of the order of 50 Hz. The low pass LC filter comprising the inductor 28 and the capacitor 29 is included to reject the high frequency to prevent this appearing at the output terminals.

In each high frequency switching cycle, between switching the first switch 12 "OFF" and switching the second switch 13 "ON" there is a small "dead time" when both the first and second switches are open, (or "OFF") in order to prevent a condition in which the first and second switches both conduct. If both switches were to simultaneously conduct, this would lead to short circuit of the input supply, iva the first and second diodes 11,14, which, being forward biassed, are both conductive.

During the "dead time" when the first and second switches are "OFF" any current still flowing in the inductor 28 or in the load, which itself may be inductive, is given two paths via which it may flow, either via switch 17 and diode 18 as shown by the dotted line in FIG. 7 or via the switch 16 and diode 15 as shown by the solid line, thus protecting the first and second switches 12,13, from high voltages that could otherwise result in damage.

Referring to FIG. 8 of the drawings, during a negative half cycle of the input supply, the second rails 22,27 and second terminals 31,33 become positive with respect to the first rails 21,26 and first terminals 30,32. The first and second switches 12,13 are held "ON". The third and fourth switches 16,17 are operated via the control means to alternately connect the common node "X" to which the first output rail is connected via the inductor 28, either to the first input rail 21 or to the second input rail 22. During one switching cycle of the control means the average voltage at the common node "X" is substantially proportional to the ratios of the "ON" time between the third and fourth switches 16,17 or to the mark to space ratio expressed as a percentage, times the instantaneous voltage across the input terminals 21,22. The mark space ratio with which the third and fourth switches are operated in the negative input supply half cycle is preferably the same as the mark space ratio with which the first and second switches are operated during the positive input supply half cycle.

During the "dead time" when the third and fourth switches are "OFF" any current still flowing in the inductor 28 or in the load, which itself may be inductive, is given two paths via which it may flow, either via second switch 13 and second diode 14, as shown dotted in FIG. 8, or via the first switch 12 and the first diode 11 as shown by the solid line, thus protecting the third and fourth switches 16,17 from high voltages that could otherwise result in damage.

The overall result at the output terminal is an AC output which is derived from the signal at the node X, when smoothed by the filter circuit comprising the inductor 28 and the capacitor 29, comprises an output signal of the same fundamental frequency as the input supply signal, but of reduced voltage. The voltage relationship between the output signal and the input signal can be written as follows:

$$AC_{out}AC_{in} \times mark\ space\ ratio$$

Referring to FIG. 9 of the accompanying drawings there is shown a second AC voltage regulator circuit according to a second specific embodiment of the present invention. The second AC voltage regulator circuit comprises an AC input 100 having first and second input terminals connected respectively to a first input rail 101 and a second input rail 102; an AC output 103 comprising first and second output terminals connected respectively to a first AC output rail 104 and a second AC output rail 105; a filter circuit comprising an inductor 106, and a capacitor 107, the inductor connected in series with the first output rail 104, and the capacitor connected across the first and second output rails 104,105; a first switching means 110 connected between the first AC input rail 101 and the first AC output rail 104, a second switching means 111 connected between the second AC input rail 102 and the first AC output rail 104, the first and second switching means connected to each other at a common node X, and the first AC output rail 104 connected to the common node X, via the inductor 106.

The first switching means comprises a first electronic switch 113 and a second electronic switch 114 serially connected with a first electronic switch. Connected in parallel across the first switch is a first diode 117. Connected across the second switch is a second diode 118, the second diode arranged for conducting current in an opposite direction to the first diode.

The second switching means 111 comprises a third electronic switch 115 connected in series with a fourth electronic switch 116, the third and fourth electronic switches being connected together in series, between the common node X and the second AC input rail 102 and the second AC output rail 105. Across the third electronic switch 115 is a third diode 119, and connected in parallel across the fourth electronic switch 116 is a fourth diode 120, the third and fourth diodes arranged for conducting current in opposite directions to each other.

The first diode is arranged to conduct current in the same direction as the third diode, and the second diode is arranged to conduct current in the same direction as the fourth diode.

The first, second, third and fourth electronic switches are operable in response to a control signal for switching a current channel ON and OFF at a high frequency, in order of several tens of kHz, for example in the range 1 kHz–100 kHz.

Preferably the electronic switches comprise semiconductor switching devices for example thyristors, bipolar transistors, field effect transistors or insulated gate bipolar transistors. Each switching means and its corresponding diode connected in antiparallel, may be integrated into a single package, or several switches and/or diodes may be packaged together.

Operation of the second AC voltage regulator circuit is as follows.

During a positive half cycle of the AC input signal, the first AC input rail 101 is positive with respect to the second AC input rail 102. The second and fourth switching devices 114,116 respectively are controlled to be conductive, ie. "ON" condition. The first and third switching devices 113, 115 respectively are operated via the control means at high frequency to alternately connect the common node "X" to which the first output rail 104 is connected via inductor 106, either to the first input rail 101, or to the second input rail 102. During one switching cycle of the control means the average voltage at the common node "X" is substantially proportional to the ratios of "on" time between the first and third switches 113,115 or "Mark to Space Ratio" expressed as a percentage term, times the instantaneous voltage across the input terminals 101,102. The operating frequency of the first and third switches is typically in the order of several tens of kHz, whereas the frequency of the AC input supply may be typically of the order of 50 Hz. Therefore a low pass LC filter comprising inductor 106 and capacitor 107 is included to reject the high frequency switched voltage at node "X", and pass the low frequency of the input supply voltage.

During the "dead time" when the first and third switches are "OFF" any current flowing in the inductor or in the load which may itself be inductive is given two paths via which to it may flow either via switching 116 and diode 119 as shown by the dotted line or via switch 114 and diode 117 as shown by the solid line thus protecting the first and third switches 113,115 from high voltages that could otherwise result in damage.

During a negative half cycle of the AC input supply, the first input rail 101 becomes negative with respect to the second input rail 102. The first and third switching devices are turned "on" so as to conduct, and the second and fourth switches 118,120 are switched ON and OFF alternately at high frequency, to chop the negative half cycle with a predetermined mark space ratio, so that the signal at the node X comprises chopped negative voltage with respect to the lower rail 102,105. During the "dead time" between switching the second and fourth switching devices, the second and fourth diodes 118,120 respectively, which are each in parallel with their respective switches, provide current path to the supply rails for dissipation of current from the node X.

During the "dead time", current dissipates from the node X via the third switch 115, and the fourth diode 120. Current may also dissipate via the switch 113 and the diode 118. Thus the voltage at the node X is unable to float outside AC input voltage range.

The specific embodiments to the present invention may have an advantage, that by controlling the switching frequency of the switching means, input frequencies from the range DC to 500 Hz may be voltage regulated without the production of significant harmonic currents or other significant mains interference. This may have an advantage of allowing the specific embodiments to be particularly suited for powering of input voltage sensitive equipment, such as, for example, computing apparatus.

Circuits according to the specific embodiments may also have an advantage of providing an AC to AC voltage regulator of reduced weight and bulk compared to conventional AC variable transformers (variacs) or auto transformers.

Typically, specific embodiments to the present invention may be able to maintain a preselected output voltage to within 1% of a preselected value, load and line regulation being typically achieved in less than 10 AC input signal cycles, from changing the input voltage or the load current. Specific embodiments to the present invention may have an advantage of being completely short circuit protected, due to the operation of the switching means. The Embodiments may be remotely controlled by a potentiometer or other control means, eg. computer control, and may be shut down within a time scale of 50 $\mu$s.

The embodiments may have an advantage of providing an AC variable voltage control device including a plurality of switching field effect transistors, a small amount of mains filtering, low cost control electronics and an output choke, mounted on a single printed circuit board.

Typically the embodiments may be capable of providing power at six amps continuous power to 10 amp peak in regulated or non regulated embodiments. Embodiments may be capable of providing power of frequencies as low as DC.

Embodiments may have an advantage of being able to respond to required voltage changes more quickly than conventional wire wound variacs, whilst being lighter, being remotely controllable, and being short circuit protected. The embodiments may have an advantage of providing very low electromagnetic interference loaded back onto an AC mains input supply.

Referring to FIG. 10 of the accompanying drawings, there is shown an electronic isolating transformer according to a third specific embodiment of the present invention.

The isolating transformer circuit comprises an input 200 consisting of a first input terminal 201 connected to an input supply rail AC1 and a second input terminal 202 connected to a second input supply rail AC2; an output 250 consisting of a first output terminal 251 connected to an output supply rail AC3 and a second output terminal 252 connected to a second output supply rail AC4; an input switching arrangement 210, and an output switching arrangement 211, the input and output switching arrangements being isolated from each other by a transformer 212, the transformer comprising for example a small ferrite transformer capable of operation of several tens of kHz; the input switching arrangement comprising a first input switch 200 comprising the first switching transistor 221 and a second switching transistor 222 connected in series with the first switching transistor, a second input switch 223 comprising a third switching transistor 224 and a fourth switching transistor 225 the third and fourth switching transistors being connected in series with each other, the first input switch being connected in series with the second input switch between the first input terminal 201 and the second input terminal 202; between the first and second input switches is connected one end of a primary winding of the transformer 212, another end of the transformer primary winding being connected to the first and second input terminals 201,202 via respective first and second series capacitors 226,227; each of the first to fourth switching transistors being provided with a respective first to fourth parallel diode 228–231, the second diode, connected across the second transistor being arranged for conducting current in a direction opposite to the first diode connected across the first transistor, the third diode connected across the third transistor being arranged for conducting current in a direction opposite to the fourth diode connected across the fourth transistor, the first and third diodes being connected for conducting current in the same direction as each other, and the second and fourth diodes being arranged for conducting current in the same direction as each other. The output switching arrangement 211 comprising a first output switch 260 and a second output switch 261, the first and second output switches being connected in series with each other across the first and second output terminals 251,252 respectively, the first output switch comprising a fifth switching transistor 262 and a sixth switching transistor 263 and the second output switch comprising a seventh switching transistor 264 and connected in series with an eighth switching transistor 265. Each of the fifth to eighth switching transistors is provided with a respective fifth to eighth diode 266–269 respectively, the fifth diode being connected for conduction of current in a direction opposite to the sixth diode and the seventh diode being connected for conduction of current in a direction opposite to that allowed by the eighth diode, the fifth and seventh diodes being connected for allowing current in a same direction, and the sixth and eighth diodes being connected for allowing current flow in the same direction, the direction of flow of current allowed by the fifth and seventh diodes being opposite to the direction of current flow allowed by the sixth and eighth diodes.

One end of a secondary winding of the transformer is connected to a node between the first and second output switches, whereas the other end of the secondary winding is connected between third and fourth capacitors 270,271 to the first output terminal 251 and the second output terminal 252. Each of the first to eighth switching transistors may be controlled by one or more switching signals provided by a control means.

Operation of the electronic isolating transformer of FIG. 10 will now be described. The electronic isolating transformer circuit of FIG. 10 is capable of transforming a DC or an AC input voltage presented at the first and second input terminals in either a step up or a step down mode to produce an AC or DC output signal at the first and second output terminals 251,252.

The circuit is capable of four quadrant operation, ie. power flow in either direction, between the input and the output or vice versa. Secondary power factor may be reflected to the primary with only a small extra leading element apparent when the circuit is on light load.

Operation of the circuit of FIG. 10 is similar to the operation of the circuit of FIG. 9 as described previously. The first to fourth switching transistors 221–225, which are each preferably isolated gate bipolar transistors, are series connected across input supply rails AC1,AC2. Each transistor has its respective corresponding diode connecting in anti parallel between the collector and emitter. During a positive half cycle, the first and third transistors 221,224 are switched at high frequency by first and second control signals SIG. A and SIG. B respectively, which are in anti phase, such that when the first transistor is ON the third transistor is OFF and vice versa. The duty cycle of the ON times of the first and third switching transistors 221,224 is held at near 50:50 with a small amount of "dead time" during which both transistors are "OFF" to ensure that short circuiting of the input supply does not occur during switching transistors. The second and fourth transistors 222 and 225 are held in the "ON" condition and can conduct current in both directions via either the appropriate transistor itself or its associated anti parallel second or fourth diode, 229,231 as appropriate. The first and third diodes connected in anti parallel with a first and third switching transistors provide paths for current to flow back onto the input supply rails AC1, AC2 from any connected reactive load.

In FIG. 10, there is shown operation during a mains positive half cycle. The signal SIG. C shows the typical voltage wave form that appears on the primary winding of the transformer during one half cycle of mains applied across the input supply rails AC1 and AC2. The transformer comprises a small ferrite transformer capable of operation at several tens of kHz and as such the secondary voltage (shown as SIG. D) follows the primary voltage accurately even at these high frequencies. If the output switching arrangement 211 is connected as a second bridge of four series connected isolated gate bipolar transistors as shown and the gate signals are the same as those in the first four isolated gate by polar transistors 221–225 the resultant output of the circuit across the output rails AC3,AC4 is proportionally and subtantially the same as the input signal across the input rails AC1, AC2. In this way, an AC low frequency to AC low frequency signal may be transformed via a small ferrite isolating transformer operating at high frequency.

The embodiment shown will operated over a frequency range from DC to approximately an order of magnitude below the high switching frequency, used for switching the switching transistors, typically 20–80 kHz. By adjusting the phase angle between the control signals SIG. A and SIG. B, the output signal and/or between control signals SIG. AA and SIG. BB and/or the percentage of dead time during its switching cycle on one or both transistor bridges 210,211 with a possible inclusion of extra inductors in series with a transformer primary and/or secondary, it is possible to adjust the value of the output voltage across the output terminals 251,252 from zero to a value determined by the turns ratio of the ferrite transformer. By this means it is also possible to compensate for voltage drops within the switching devices and transformer regulation, thus providing load compensation.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

We claim:

1. A voltage regulator circuit comprising:
   an AC input having first and second input terminals for receiving an AC input signal;
   an AC output having first and second output terminals for outputting an AC output signal; and
   switching means for alternatively connecting and disconnecting the input terminals with the output terminals so as to allow or prevent transmission of the input signal to the output, the switching means being arranged to switch in response to a control signal,
   wherein the switching means includes four directional switching networks, a first pair of said directional switching networks being connected and aligned to permit current flow from the first input terminal to the second input terminal, the second pair of said directional switching networks being connected and aligned to permit current flow from the second input terminal to the first input terminal,
   during one half cycle of the AC input the directional switching networks from said first pair of directional switching networks are alternatively opened and closed while the second pair of directional switching networks are held closed, and conversely during the inverse half cycle of the AC input the directional switching networks from the second pair of directional switching networks are alternately opened and closed while the first pair of directional switching networks are held closed, and
   the AC output connection to one of said output terminals is derived from a common connection node between the junction of the first pair of directional switching networks and the junction of the second pair of directional switching networks, the AC output to the other of said output terminals being derived from one of the input terminals.

2. A voltage regulator circuit according to claim 1, wherein the switching means is symmetrical so as to provide bidirectional operation, so that the functions of the AC input and the AC output are interchangeable, depending on the power flow at any instant.

3. A voltage regulator circuit according to claim 1, wherein the pair of directional switching networks that are alternatively opened and closed are operated by the control signal at a frequency substantially higher than that of the AC input.

4. A voltage regulator circuit according to claim 1, further comprising a control means for generating the control signal for controlling the directional switching networks.

5. A voltage regulator circuit according to claim 1, in which by varying a parameter of the control signal, a time in which the input is connected to the output, and consequently the time during which the AC input signal is transmitted to the output to appear as the output signal, can be varied.

6. A voltage regulator circuit according to claim 5, in which a voltage of the output signal may be controlled by varying one or more parameters of the control signal.

7. A voltage regulator circuit according to claim 5, in which a voltage of the output signal may be controlled by varying a duty cycle and/or a phase relationship of the control signal.

8. A voltage regulator circuit according to claim 1, wherein the pair of directional switching networks that are alternatively opened and closed are simultaneously each non-conducting for a predetermined time in each cycle of the control signal.

9. A voltage regulator circuit according to claim 1, wherein the pair of directional switching networks that are alternatively opened and closed operate with a control signal cycle having a frequency in the range of about 1 KHz to about 30 MHz.

10. A voltage regulator circuit according to claim 9, wherein an input frequency of the AC input supply is up to 500 Hz.

11. A voltage regulator circuit according to claim 4, in which said control means comprises a pulse width modulation circuit responding to an input from means such as a potentiometer, computer, a feedback circuit or a combination of the aforesaid.

12. A voltage regulator circuit according to claim 1, in which each directional switching network comprises an electronic switch in series with a diode.

13. A voltage regulator circuit according to claim 12, in which the electronic switch is a transistor or other semiconductor switching device, operable in response to the control signal.

14. A voltage regulator circuit according to claim 12, in which the switch and diode are included in a single integrated circuit.

15. A voltage regulator circuit according to claim 12, wherein on each side of the common connection node, each switch is connected in parallel to the diode from the directionally opposed switching network and the resulting parallel configuration is incorporated in a single integrated circuit.

16. A voltage regulator circuit according to claim 1, in which there is provided a filter between the input terminals and the output terminals.

17. A voltage regulator circuit according to claim 16, in which said filter is provided between the switching means and the output.

18. A voltage regulator circuit according to claim 17, wherein said filter comprises an inductor and a capacitor.

19. A voltage regulator circuit according to claim 18, in which the inductor is connected serially between the switching means and the first or second output terminal.

20. A voltage regulator circuit according to claim 19, in which the capacitor is connected in parallel across the first and second output terminals.

21. A transformer circuit comprising a pair of voltage regulator circuits according to claim 1, connected together in series, with an isolating transformer for isolating the output of a first of the said circuits from the input of a second of the said circuits.

* * * * *